US010123368B2

(12) United States Patent
Gundavelli et al.

(10) Patent No.: US 10,123,368 B2
(45) Date of Patent: Nov. 6, 2018

(54) SYSTEMS AND METHODS FOR SUPPORTING MULTIPLE ACCESS POINT NAMES FOR TRUSTED WIRELESS LOCAL AREA NETWORK

(75) Inventors: Srinath Gundavelli, San Jose, CA (US); Mark Grayson, Maidenhead (GB); Sanjay Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 13/568,789

(22) Filed: Aug. 7, 2012

(65) Prior Publication Data

US 2013/0223421 A1   Aug. 29, 2013

Related U.S. Application Data

(60) Provisional application No. 61/602,271, filed on Feb. 23, 2012.

(51) Int. Cl.
  *H04W 76/12*   (2018.01)
  *H04W 84/12*   (2009.01)
(52) U.S. Cl.
  CPC ............ *H04W 76/12* (2018.02); *H04W 84/12* (2013.01)
(58) Field of Classification Search
  CPC ........ H04L 12/803; H04W 8/26; H04W 8/04; H04W 36/0016; H04W 76/02; H04W 8/12; H04W 88/16; H04W 8/183; H04W 36/08
  USPC .......................... 370/235, 254, 331, 334–338
  See application file for complete search history.

(56) References Cited

U.S. PATENT DOCUMENTS

| | | | |
|---|---|---|---|
| 5,717,690 A | 2/1998 | Peirce, Jr. et al. |
| 5,898,713 A | 4/1999 | Melzer et al. |
| 6,157,649 A | 12/2000 | Peirce et al. |
| 6,522,880 B1 | 2/2003 | Verma et al. |
| 6,643,621 B1 | 11/2003 | Dodrill et al. |
| 6,654,792 B1 | 11/2003 | Verma et al. |
| 6,738,362 B1 | 5/2004 | Xu et al. |
| 6,763,018 B1 | 7/2004 | Puthiyandyil et al. |

(Continued)

FOREIGN PATENT DOCUMENTS

| | | |
|---|---|---|
| EP | 1250022 A1 | 10/2002 |
| EP | 1587271 | 10/2005 |

(Continued)

OTHER PUBLICATIONS

U.S. Appl. No. 13/332,804, Goerke et al.

(Continued)

*Primary Examiner* — Redentor Pasia
*Assistant Examiner* — Peter K Mak
(74) *Attorney, Agent, or Firm* — Patterson + Sheriden, LLP

(57) ABSTRACT

Systems and methods are provided for supporting multiple access point names for trusted wireless local area network (LAN.) In one method, the method includes receiving a packet at a mobile access gateway from a UE operating in a trusted wireless LAN, determining at the mobile access gateway an access point name (APN) associated with the received packet, and analyzing a binding update list (BUL) table to identify an IP address of the UE used by the determined APN. The method further includes modifying a source IP address of the received packet to the IP address of the UE used by the determined APN, and transmitting the packet to a home network associated with the APN.

23 Claims, 10 Drawing Sheets

(56) References Cited

U.S. PATENT DOCUMENTS

| | | | |
|---|---|---|---|
| 6,917,592 B1 | 7/2005 | Ramankutty et al. | |
| 6,922,411 B1 | 7/2005 | Taylor | |
| 7,340,744 B2 | 3/2008 | Chandwadkar et al. | |
| 7,362,776 B2 | 4/2008 | Meier et al. | |
| 7,415,523 B2 | 8/2008 | O'Rourke et al. | |
| 7,426,213 B2 | 9/2008 | Xu et al. | |
| 7,720,061 B1 | 5/2010 | Krishnaswamy et al. | |
| 7,792,113 B1 | 9/2010 | Foschiano et al. | |
| 7,808,919 B2 | 10/2010 | Nadeau et al. | |
| 7,827,256 B2 | 11/2010 | Phillips et al. | |
| 7,856,512 B2 | 12/2010 | Hilla et al. | |
| 7,885,248 B2 | 2/2011 | Harper et al. | |
| 7,885,260 B2 | 2/2011 | Paul et al. | |
| 7,890,636 B2 | 2/2011 | Grayson et al. | |
| 7,929,973 B2 | 4/2011 | Zavalkovsky et al. | |
| 8,036,665 B2 | 10/2011 | Shah | |
| 8,064,909 B2 | 11/2011 | Spinelli et al. | |
| 8,064,948 B2 | 11/2011 | Meier et al. | |
| 8,432,871 B1* | 4/2013 | Sarnaik | H04W 76/12 370/331 |
| 8,599,790 B1* | 12/2013 | Damle | H04W 76/12 370/331 |
| 2003/0028644 A1 | 2/2003 | Maguire et al. | |
| 2004/0088385 A1 | 5/2004 | Blanchet et al. | |
| 2004/0136337 A1 | 7/2004 | Walter et al. | |
| 2004/0224678 A1 | 11/2004 | Dahod et al. | |
| 2004/0236855 A1 | 11/2004 | Peles | |
| 2005/0078691 A1 | 4/2005 | Davison et al. | |
| 2005/0091371 A1 | 4/2005 | Delegue et al. | |
| 2005/0148368 A1 | 7/2005 | Scheinert et al. | |
| 2005/0186948 A1 | 8/2005 | Gallagher et al. | |
| 2005/0239473 A1 | 10/2005 | Pan et al. | |
| 2005/0286504 A1 | 12/2005 | Kwon | |
| 2006/0018328 A1 | 1/2006 | Mody et al. | |
| 2006/0067273 A1 | 3/2006 | Suman et al. | |
| 2006/0187873 A1 | 8/2006 | Friday et al. | |
| 2006/0227705 A1 | 10/2006 | Chandwadkar et al. | |
| 2006/0234678 A1 | 10/2006 | Juitt et al. | |
| 2006/0268901 A1 | 11/2006 | Choyi et al. | |
| 2006/0291388 A1 | 12/2006 | Amdahl et al. | |
| 2007/0097983 A1 | 5/2007 | Nylander et al. | |
| 2007/0105568 A1 | 5/2007 | Nylander et al. | |
| 2007/0116019 A1 | 5/2007 | Cheever et al. | |
| 2007/0116020 A1 | 5/2007 | Cheever et al. | |
| 2007/0183427 A1 | 8/2007 | Nylander et al. | |
| 2007/0243872 A1 | 10/2007 | Gallagher et al. | |
| 2007/0253328 A1 | 11/2007 | Harper et al. | |
| 2007/0253371 A1 | 11/2007 | Harper et al. | |
| 2008/0137541 A1 | 6/2008 | Agarwal et al. | |
| 2008/0159227 A1* | 7/2008 | Ulupinar | H04W 8/04 370/331 |
| 2008/0162637 A1 | 7/2008 | Adamczyk et al. | |
| 2008/0176582 A1 | 7/2008 | Ghai et al. | |
| 2008/0188223 A1 | 8/2008 | Vesterinen et al. | |
| 2008/0298309 A1 | 12/2008 | DePietro et al. | |
| 2008/0310404 A1 | 12/2008 | Valme et al. | |
| 2008/0316980 A1 | 12/2008 | Ahlen et al. | |
| 2008/0317053 A1 | 12/2008 | Panda et al. | |
| 2009/0023426 A1* | 1/2009 | Shatzkamer | H04M 3/42246 455/414.1 |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0086742 A1 | 4/2009 | Ghai et al. | |
| 2009/0089447 A1 | 4/2009 | Balachandran et al. | |
| 2009/0098872 A1 | 4/2009 | Deshpande et al. | |
| 2009/0129271 A1 | 5/2009 | Ramankutty et al. | |
| 2009/0129341 A1 | 5/2009 | Balasubramanian et al. | |
| 2009/0141625 A1 | 6/2009 | Ghai et al. | |
| 2009/0156213 A1 | 6/2009 | Spinelli et al. | |
| 2009/0196253 A1 | 8/2009 | Semper | |
| 2009/0207759 A1 | 8/2009 | Andreasen et al. | |
| 2009/0215438 A1 | 8/2009 | Mittal et al. | |
| 2009/0262682 A1 | 10/2009 | Khetawat et al. | |
| 2009/0285225 A1 | 11/2009 | Dahod | |
| 2009/0286510 A1 | 11/2009 | Huber et al. | |
| 2009/0298470 A1 | 12/2009 | Huber et al. | |
| 2010/0027448 A1 | 2/2010 | Puthiyandyil et al. | |
| 2010/0039978 A1 | 2/2010 | Rangan | |
| 2010/0039993 A1 | 2/2010 | Ramankutty et al. | |
| 2010/0041373 A1 | 2/2010 | Ramankutty et al. | |
| 2010/0077102 A1 | 3/2010 | Lim et al. | |
| 2010/0085978 A1 | 4/2010 | Ramankutty et al. | |
| 2010/0091653 A1 | 4/2010 | Koodli et al. | |
| 2010/0124933 A1 | 5/2010 | Chowdhury et al. | |
| 2010/0128708 A1 | 5/2010 | Liu et al. | |
| 2010/0195640 A1 | 8/2010 | Park et al. | |
| 2010/0203890 A1 | 8/2010 | Nagaraja et al. | |
| 2010/0291897 A1 | 11/2010 | Ghai | |
| 2010/0322106 A1* | 12/2010 | Qiang | H04W 76/021 370/254 |
| 2011/0021192 A1 | 1/2011 | Grayson et al. | |
| 2011/0021196 A1 | 1/2011 | Grayson et al. | |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |
| 2012/0166618 A1 | 6/2012 | Dahod et al. | |
| 2012/0170548 A1 | 7/2012 | Rajagopalan et al. | |
| 2014/0101726 A1* | 4/2014 | Gupta | H04N 21/2365 726/4 |

FOREIGN PATENT DOCUMENTS

| | | |
|---|---|---|
| EP | 1619917 A1 | 1/2006 |
| EP | 1978685 B1 | 5/2011 |
| GB | 2410865 | 8/2005 |
| WO | WO-2004010668 | 1/2004 |
| WO | WO-20090089455 A1 | 7/2009 |

OTHER PUBLICATIONS

Calhoun, et al. "CAPWAP Protocol Specification: draft-ietf-capwap-protocol-specification-15". Network Working Group, Internet-Draft. Oct. 31, 2008. 166 pages.

Gundavelli, S. et al. "Proxy Mobile IPv6." Network Working Group. Standards Track. Aug. 2008. 93 pages.

No Author Listed. "3rd Generation Partnership Project; Technical Specification Group Core Network and Terminals; Access Network Discovery and Selection Function (ANDSF) Management Object (MO) (Release 11)". 3GPP TX 24.312 v 11.0.0. Sep. 2011. 157 pages.

No Author Listed. "3rd Generation Partnership Project; Technical Specification Group Core Network Terminals; Access to the 3GPP Evolved Packet Core (EPC) via non-3GPP access networks; Stage 3 (Release 11)". 3GPP TS 24.302 v11.0.0. Sep. 2011. 58 pages.

No Author Listed. "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)". 3GPP TS 36.305 v10.3.0. Sep. 2011. 51 pages.

No Author Listed. "3rd Generation Partnership Project; Technical Specification Group Services and System Aspects; Functional stage 2 description of Location Services (LCS) (Release 10)". 3GPP TS 23.271 v10.2.0. Mar. 2011. 169 pages.

No Author Listed. "Lightweight AP (LAP) Registration to a Wireless LAN Controller (WLC)." Document ID: 70333. Cisco Systems, Inc. Internal Document. Sep. 12, 2008. 13 pages.

No Author Listed. "LTE; Evolved Universal Terrestrial Radio Access Network (E-UTRAN); S1 Application Protcol (S1AP) (3GPP TS 36.413 version 10.6.0 Release 10)." ETSI TS 136 413 v10.6.0. Jul. 2012. 262 pages.

No Author Listed. "LTE; Evolved Universal Terrestrial Radio Access Network (E-UTRAN); X2 Application Protocol (X2AP) (3GPP TS 36.423 version 10.5.0 Release 10)." ETSI TS 136 423 v10.5.0. Mar. 2012. 137 pages.

No Author Listed. "Universal Mobile Telecommunications System (UMTS); LTE; Architecture Enhancements for Non-3GPP Accesses (3GPP TS 23.402 version 10.4.0 Release 10)" ETSI TS 123 402 v 10.4.0. Jun. 2011. 233 pages.

(56) References Cited

OTHER PUBLICATIONS

No Author Listed. "Cisco Location Service Solution: Enabling Mobility in Wired and Wireless Networks and Modular Cisco Catalyst Platforms: Solution Overview". Cisco Public Information. 2009-2011. 5 pages.
Simsek, et al. "Analysis of the QBSS Load Element Parameters of 802.11e for a priori Estimation of Service Quality". Institut für Informatik, HU Berlin. No date given. 12 pages.
Wakikawa, R. et al. "IPv4 Support for Proxy Mobile IPv6." Internet Engineering Task Force (IETF). Standards Track. ISSN: 2070-1721. May 2010. 50 pages.
3GPP TR 25.820 v8.0.0 (Mar. 2008), 3rd Generation Partnership Project; Technical Specification Group Radio Access Networks; 3G Home NobeB Study Item Technical Report (Release 8); http://www.3gpp.org, 2008. 37 pages.
3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TS 22.011 v8.4.0 (Jun. 2008), 3rd Generation Partnership Project; Technical Specification Group Services and System Aspects; Service accessibility (Release 8), Global System for Mobile Communications, http://www/3gpp.org, 2008. 25 pages.
3GPP TS 22.220 v0.3.0 (Jul. 2008), 3rd Generation Partnership Project; Technical Specification Group Services and System Aspects; Service requireements for Home NodeBs and Home eNodeBs; (Release 9), http://www.3gpp.org, 2008. 13 pages.
3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006. 36 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.
3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v. 10 Technical Specification. "3rd Generation Partnership Project; Technical Specification Group Services and Systems Aspects; Intra-Domain Connection of Radio Access Network (RAN) Nodes to Multiple Cor Network (CN) Nodes (Release 10)." Mar. 2010. 39 pages.
3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.
3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.
3GPP TS 24.234 v7.5.0 (Mar. 2007), 3rd Generation Partnership Project; Technical Specification Group Core Network and Terminals; 3GPP System to Wireless Local Area Network (WLAN) interworking; Wlan User Equipment (WLAN UE) to network protocols; Stage 3 (Release 7), Global System for Mobile Communications, http://www.3gpp.org, 2007. 32 pages.
3GPP TS 25,412 v7.1.0 (Jun. 2006), 3rd Generation Partnership Project; Technical Specification Group Radio Access Network; UTRAN lu interface signaling transport (Release 7), http://www.3gpp.org, 2006. 11 pages.
3GPP TS 25.410 v7.0.0 (Mar. 2006), 3rd Generation Partnership Project; Technical Specification Group Radio Access Network; UTRAN lu Interface: general aspects and principles (Release 7), http://www.3gpp.org, 2006. 28 pages.
3GPP TS 25.411 v7.1.0 (Sep. 2007); 3rd Generation Partnership Project; Technical Specification Group Radio Access Network; UTRAL lu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN lu interface Ranap signaling (Release 7), http://www.3gpp.org, 2007. 359 pages.
3GPP TS 25.414 v7.1.0 (Sep. 2006), 3rd Generation Partnership Project; Technical Specification Group Radio Access Network; UTRAN lu interface transport and transport signaling (Release 7), http://www.3gpp.org, 2006. 20 pages.
3GPP TS 25.415 v7.3.0 (Dec. 2006), 3rd Generation Partnership Project; Technical Specification Group Radio Access Network; UTRAN lu interface user plane protocols (Release 7), http://www.3gpp.org, 2006. 64 pages.
3GPP TS 25.419 v7.0.0 (Mar. 2006), 3rd Generation Partnership Project; Technical Specification Group RAN; UTRAN lu-BC Interface: Service Area Broadcast Protocol (SABP) (Release 7), http://www.3gpp.org, 2006. 77 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.232 v8.3.0 (Jun. 2008), 3rd Generation Partnership Project; Technical Specification Group Core Network and Terminals; Media Gateway Controller (MGC)—Media Gateway (MGW) interface; Stage 3 (Release 8), http://www.3gpp.org, 2008. 145 pages.
3GPP TS 29.234 v7.9.0 (Jun. 2008), 3rd Generation Partnership Project; Technical Specification Group Core Network and Terminals; 3GPP system to Wirelss Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
3GPP TS 33.234 v8.1.0 (Mar. 2008), 3rd Generation Partnership Project; Technical Specification Group Service and System Aspects; 3G Security; Wirelss Local Area Network (WLAN) interworking security (Release 8), http://www.3gpp.org, 2008. 101 pages.
3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.

(56) References Cited

OTHER PUBLICATIONS

3GPP TS. 23.203 v. 11.3.0 Technical Specification. "3rd Generation Partnership Project; Technical Specification Group Services and System Aspects; Policy and charging control architecture (Release 11)", Sep. 2011, 167 pages.
3GPP TS. 23.401 v. 10.5.0 Technical Specification. "3rd Generation Partnership Project; Technical Speficiation Group Services and System Aspects: General Packet Radio Service (GPRS) enhancements for Evolved Universal Terrestrial Radio Access Network (E-UTRAN) access (Release 10)." Sep. 2011, 282 pages.
3GPP TS. 23.829 v. 10.0.1 Technical Specification. "3rd Generation Partnership Project; Technical Specification Group Services and System Aspects; Local IP Access and Selected IP Traffic Offload (LIPA-SIPTO) (Release 10)." Oct. 2011, 43 pages.
File History for U.S. Appl. No. 61/177,491, filed May 12, 2009, 71 pages.
Gotchev, S. et al., "SP WiFi Packet Core Integration," Cisco (Belgrade), 39 pages (Mar. 21, 2012).
Gundavelli, S. et al., "Multiple APN Support for Trusted WLAN Access," IETF 83 (Paris), 11 pages (Mar. 2012).
Gundavelli, Sri, "Evolving Source Address Selection Rules for Mobility Awareness," Cisco 15 pages (2010).
International Search Report and Written Opinion issue for PCT/US2010/50418, dated Nov. 19, 2010 (14 pages).
International Search Report and Written Opinion issued for PCT/US2010/50427, dated Mar. 6, 2012 (9 pages).

\* cited by examiner

| Flow Direction | IP flow Selector | Translation | Outgoing Interface |
|---|---|---|---|
| Uplink (Source: IP-1 Destination: CN) | Can use application type (SIP, RTP) | Source IP Address IP-1 → IP-2 | PGW (Tunnel-0) |
| Downlink (Source: CN Destination: IP-2) | Can use source IP address or incoming tunnel interface ID | Destination IP Address IP-2 → IP-1 | Access Link (UE-MAG Link) |

FIG. 5

SYSTEMS AND METHODS FOR SUPPORTING MULTIPLE ACCESS POINT NAMES FOR TRUSTED WIRELESS LOCAL AREA NETWORK

CROSS-REFERENCE TO RELATED APPLICATIONS

This application claims the benefit under 35 U.S.C. § 119(e) of the earlier priority date of U.S. Provisional Patent Application No. 61/602,271, entitled "MULTIPLE APN SUPPORT FOR TRUSTED WIRELESS LAN ACCESS," by Gundavelli et al., filed on Feb. 23, 2012, which is hereby incorporated by reference herein in its entirety.

FIELD OF DISCLOSURE

This disclosure relates generally to systems and methods for load balancing in heterogeneous radio system deployments, for example between cellular networks and wireless local area networks (WLANs).

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology.

The increase in data traffic is straining wireless network operators' existing packet core elements. The increase in data traffic can overload network devices in wireless networks, and it may even cause wireless network service disruptions. The demand for data over wireless networks is not expected to slow, especially as mobile devices become more sophisticated and as users become more dependent on mobile devices.

BRIEF DESCRIPTION OF THE DRAWINGS

FIG. 5 illustrates network address translation rules in accordance with certain embodiments of the disclosed subject matter.

DESCRIPTION OF EXAMPLE EMBODIMENTS

Overview

Figure 1:
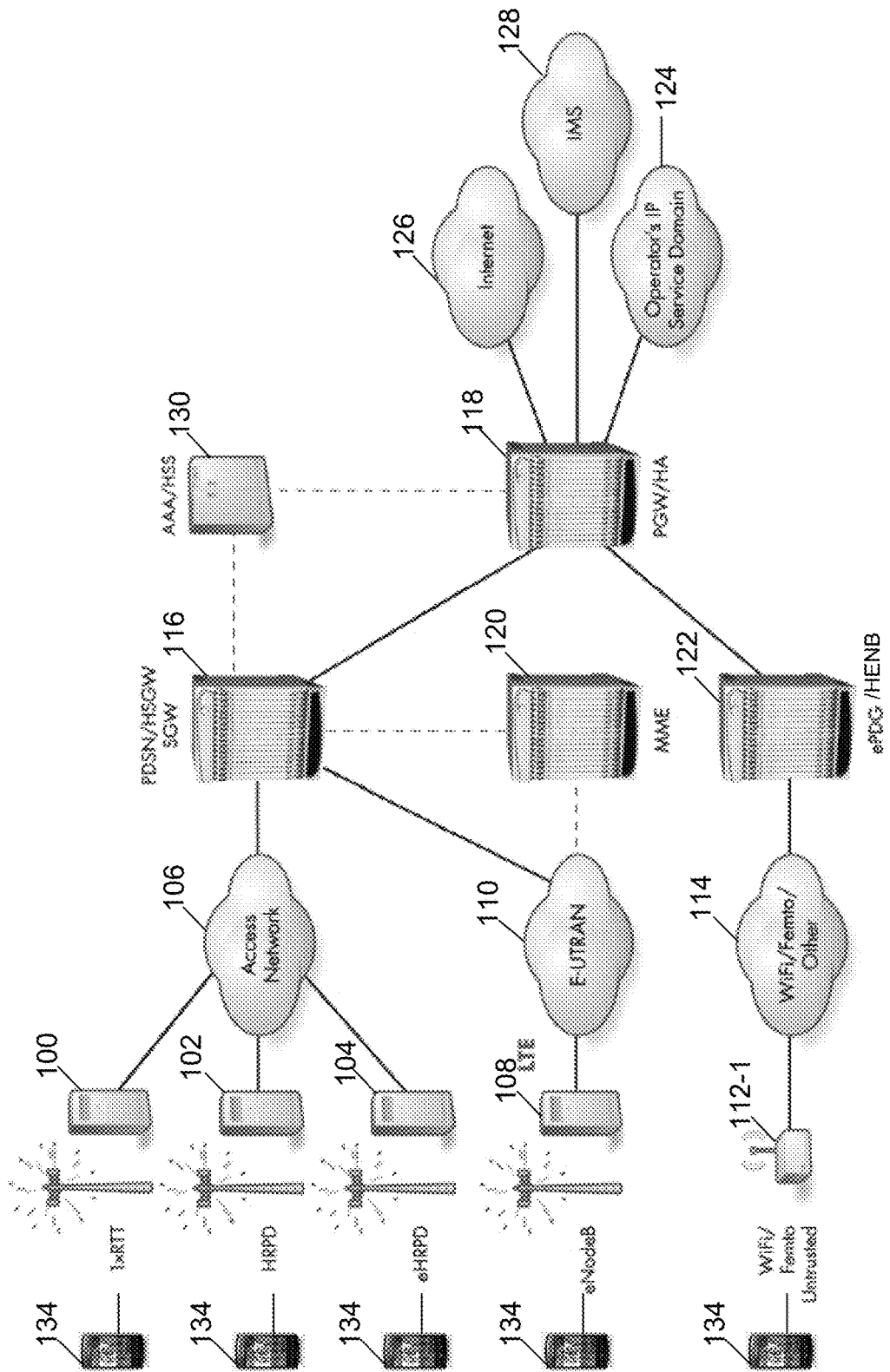
FIGS. 1-2 illustrate a communication network including a long term evolution (LTE) topology in accordance with certain embodiments of the disclosed subject matter.

Certain embodiments of the disclosed subject matter relate to providing multiple access point names for trusted wireless local area network (LAN.) In one method, the method includes receiving a packet at a mobile access gateway from a UE operating in a trusted wireless LAN, determining at the mobile access gateway an access point name (APN) associated with the received packet, and analyzing a binding update list (BUL) table to identify an IP address of the UE used by the determined APN. The method further includes modifying a source IP address of the received packet to the IP address of the UE used by the determined APN, and transmitting the packet to a home network associated with the APN.

Example Embodiments

Network operators can address a rapid increase in data traffic by correspondingly increasing the network capacity. One way to increase the network capacity is by deploying parallel radio networks to provide connection to a core network. For example, a network operator can deploy, in a single region, both a cellular radio access network and a wireless local area network (LAN) so that a portion of the data traffic is serviced through the cellular radio access network and the rest of the data traffic is serviced through the wireless LAN.

The wireless LAN can be coupled to the core network through a protocol interface. One of the key interfaces for coupling the wireless LAN to a core network is the $3^{rd}$ Generation Partnership Project (3GPP) S2a interface. The 3GPP S2a interface is designed to connect a trusted non-3GPP IP access technology, such as a trusted wireless LAN, to a 3GPP core network. For example, the 3GPP S2a interface can couple a mobile access gateway (MAG) in a trusted wireless LAN to a packet gateway (PGW) in a core network to provide communication between the trusted wireless LAN and the core network.

One drawback of deploying a parallel trusted wireless LAN is the wireless LAN's lack of support for multiple access point names (APNs.) An APN indicates the type of network service to be provided to a mobile device. An APN can be conceptually considered a service name. For example, different APNs may be associated with different home networks that provide different services to a mobile device. Different applications running on a mobile device can use different home networks (i.e., APNs) to receive services. Different APNs can use different IP addresses to reach the same mobile device because different APNs may use different IP Packet Data Networks for delivering services to a mobile device.

In a wireless LAN, a mobile device can receive service only from a single APN because a mobile device's wireless LAN interface can only be assigned a single IP address. The Dynamic Host Configuration Protocol (DHCP), which is used to assign IP addresses to mobile devices over wireless LAN networks, lacks semantics for assigning multiple IP addresses to the wireless LAN interface of the mobile device. Because a single IP address can only be associated with a single APN, a mobile access gateway (MAG) is essentially forced to support at most one APN per mobile device's wireless LAN interface at any moment in time.

Unfortunately, the lack of support for multiple APNs poses challenges for network operators because network operators have deployed application-specific APNs for many years and those networks are still in operation. Therefore, it is critical for the network operator to provide access to multiple APNs in a consistent manner, irrespective of what radio technology is used by the mobile device to connect to the core network. Thus, there are needs and interests in the art to support multiple APNs for mobile devices in a trusted wireless LAN.

The disclosed systems and methods include a mechanism for supporting multiple APNs for mobile devices in a trusted wireless LAN. The disclosed systems include a mobile access gateway (MAG) that mediates communication between a mobile device in a trusted wireless LAN and multiple home networks (i.e., APNs.) Even though the mobile device in the trusted wireless LAN is assigned a single IP address, the MAG can mediate communication between the mobile device and multiple APNs by translating the mobile device's IP address to an IP address known by the particular APN currently communicating with the mobile device and vice versa. For example, when the MAG receives a packet from a mobile device, the MAG can determine the APN to which the incoming packet is directed, replace the source IP address with the IP address associated with the particular APN, and transmit the packet with the replaced source IP address. Likewise, when the MAG receives a packet from an APN, the MAG can replace the destination IP address of the packet, which identifies the mobile device using an APN-specific IP address, with the IP address currently assigned to the mobile device in the trusted wireless LAN networks. Subsequently, the MAG can transmit the packet with the replaced destination IP address to deliver the packet to the mobile device. This way, the MAG can mediate communication between a mobile device and multiple APNs. This also works for inter-MAG roaming scenarios. Since the NAT state, generated by the MAG, uses the IP addresses corresponding the APNs, a new MAG can always generate the NAT state. When a mobile node roams from one MAG to another MAG, the new MAG can recreate the exact same NAT state.

In some embodiments, a mobile device's wireless LAN interface can be assigned an IP address associated with a default APN. For example, when a mobile device attaches to the MAG, the MAG can establish a packet data network (PDN) connection with a default APN for the mobile device. Once the MAG receives an IP address associated with this default PDN connection, the MAG can assign the received IP address to the mobile device's wireless LAN interface.

In some embodiments, the MAG can maintain bindings between an IP address of the mobile device and APN-specific IP addresses. The MAG can use such bindings to provide network address translation. In some cases, the MAG can generate a binding between an APN and an IP address whenever a mobile device initiates communication with the APN for the first time. For example, when the MAG receives an IP address associated with the default PDN connection, the MAG can create a Binding Update List (BUL) entry that binds the mobile device's assigned IP address to the IP address associated with the default APN, which are in fact identical. This BUL entry can be stored in a BUL table.

At a later point in time, the mobile device can launch a different application associated with a different APN and send an IP packet to the MAG, requesting the MAG to proxy the packet to the APN. When the MAG receives a packet from the mobile device, the MAG can determine the APN associated with the received IP packet based on applying some traffic detection functions (TDF.) If the received IP packet is associated with an APN different from the ones listed in the BUL table, the MAG can establish a new PDN connection with the new APN, and receive a new IP address associated with the new APN. Subsequently, the MAG can create a BUL entry for the new APN-specific IP address, and store the BUL entry in the BUL table. Then, the MAG can use the new BUL entry to translate the network address of the received packet and route the packet to the particular APN.

FIG. 1 illustrates a communication system with parallel networks in accordance with certain embodiments of the disclosed subject matter. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., Wi-Fi), Femto, WiMAX, or any other radio spectrum technology, can use a transceiver shown generally at 112-1 to connect a user equipment (UE) 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WLAN/Femto/other transceiver 112-1. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 134 is detached from the network, the HSS 130 maintains the binding information until the UE 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW.) For idle state UEs, the SGW terminates the down link data path and triggers paging when down link data arrives for the UE in an idle state. The SGW manages and stores UE contexts, e.g. parameters of the IP bearer service and network internal routing information. The SGW also performs replication of the user traffic in case of lawful interception.

The PGW provides a layer three (L3) point of attachment for the UE 134 and acts as the interface between the LTE network and other packet data networks, such as the Internet or SIP-based IMS networks (fixed and mobile). The PGW serves as the anchor point for intra-3GPP network mobility, as well as a local mobility anchor between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME 120 resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

The MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG/HeNB 122 is responsible for interworking between the EPC and UE 134 when operating on non-trusted non-3GPP access technologies such as a WLAN, WiMAX DSL, FTTH access networks. The ePDG/HeNB 122 can use IPSec/IKEv2 to provide secure access between the UE and the EPC network. The UE 134 can use the IKEv2 protocol to signal APN information when on untrusted non-3GPP access networks. Optionally, the ePDG/HeNB 122 can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
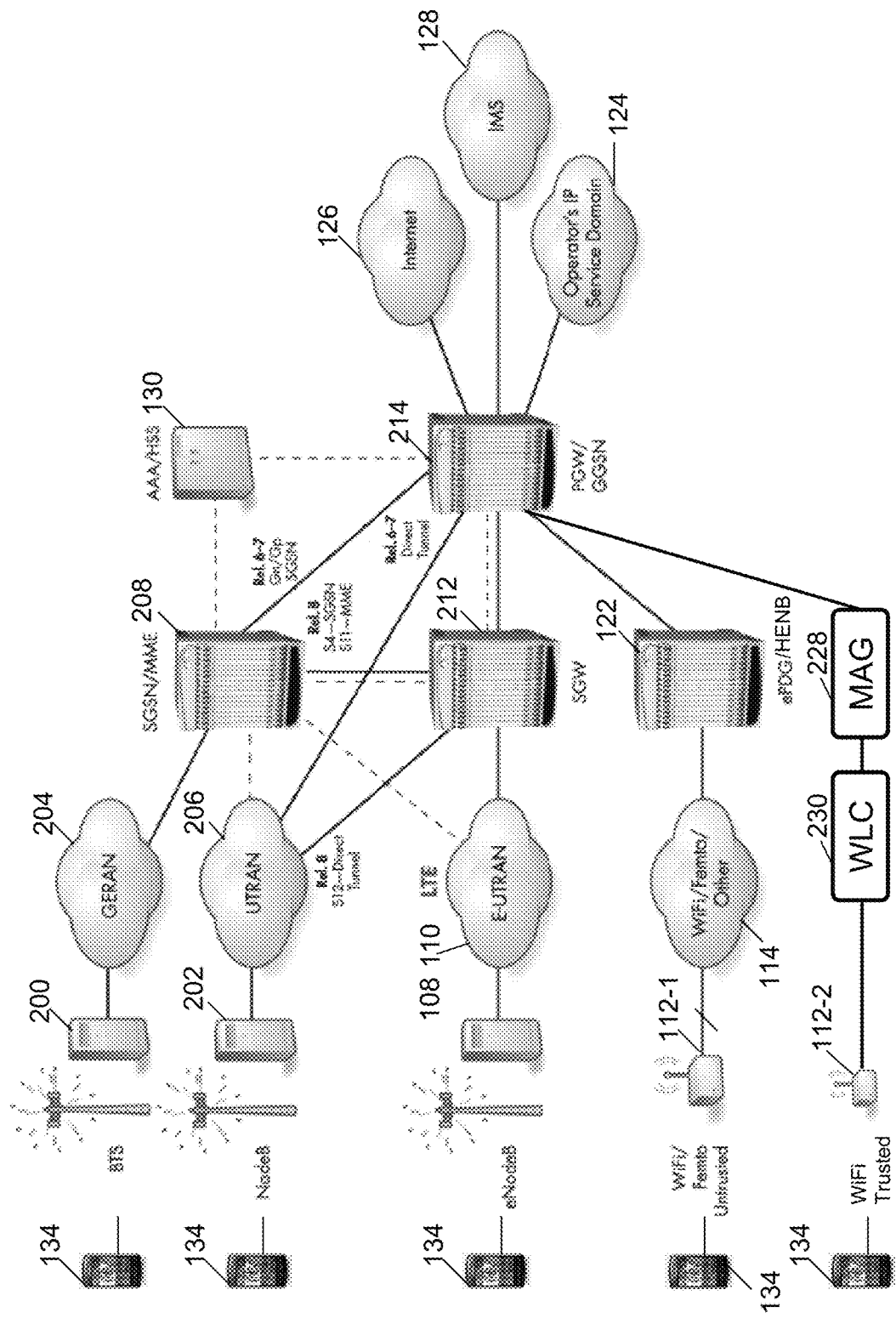

FIG. 2 illustrates a communication system with parallel networks in accordance with legacy universal mobile telecommunications systems (UMTS) network devices in accordance with certain embodiments of the disclosed subject matter. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214. UEs 134 can receive data service via a trusted WLAN network. The trusted WLAN can include an access point (AP) 112-2, a wireless LAN controller (WLC) 230, and a mobile access gateway (MAG) 228.

The WLC 230 can be in charge of configuring the wireless LAN. The WLC 230 can provide configuration information to the access point (AP) 112-2 so that the AP 112-2 can act as a wireless interface to the UEs 134. The WLC 230 can use a Control And Provisioning of Wireless Access Points (CAPWAP) protocol to communicate with the AP 112-2. A WLC 230 can perform some of the traditional roles of access points, such as an association or an authentication of user equipments. The WLC 230 can register the AP 112-2 and receive management and data packets from the AP 112-2. The WLC 230 would then switch the received packets to the wired portion of the network.

In some embodiments, the WLC 230 can also be coupled to a mobile access gateway (MAG) 228. The MAG 228 can be configured to communicate with a PGW 214 to provide network access to the UE 134. The MAG 228 can communicate with the PGW 214 using a 3GPP S2a interface. In some embodiments, the MAG 228 and the WLC 230 can be located in a single machine.

The AP 112-2 can be equipped with antennas that are configured to transmit and receive data. For example, the AP 112-2 may transmit video or audio traffic and receive acknowledgements. In one embodiment, the AP 112-2 can communicate in accordance with IEEE 802.11 standard, including for example, IEEE 802.11n and 802.11k. The AP 112-2 may transfer video or other forms of high data rate traffic such as audio, or any other type of data traffic.

In some embodiments, the mechanism for supporting multiple APNs on a trusted wireless LAN can be implemented on gateways, such as PGW/HA 118, PDSN/HSGW/SGW 116, SGSN/MME 208, PGW/GGSN 214, SGW 212, or a mobile access gateway (MAG) 228. The gateways can access and maintain information relating to the communication session, the subscriber, the radio bearers, and the policies relating to the communication session. The gateways may be used to provide various services to a UE 134 and implement the quality of service (QoS) on packet flows. Several of these functions are used in providing, for example, voice over IP (VoIP) routing and enhanced services, such as enhanced charging, stateful firewalls, and traffic performance optimization (TPO). The communication networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

Figure 3:
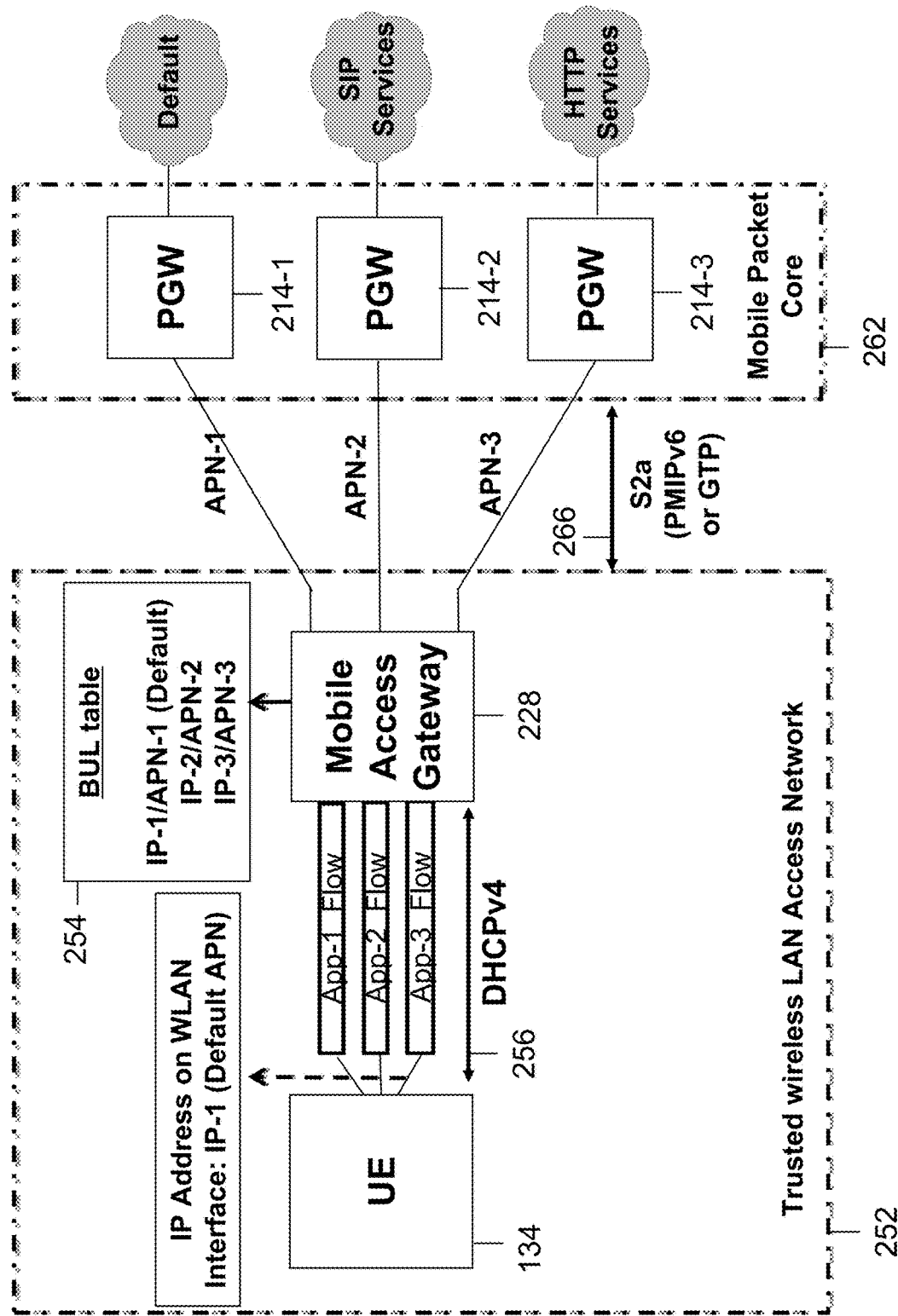
FIG. 3 shows a communication system in accordance with certain embodiments of the disclosed subject matter.

FIG. 3 shows a communication system in accordance with certain embodiments of the disclosed subject matter. FIG. 3 includes a trusted wireless LAN access network 252 and a mobile packet core 262. The trusted wireless LAN access network 252 can include a UE 134, a MAG 228, a Binding Update List (BUL) table 254, and at least one communication channel 256 between the UE 134 and the MAG 254. In some embodiments, the BUL table 254 can be maintained within the MAG 228. The communication channel 256 between the UE 134 and the MAG 228 can be established using a DHCPv4 protocol. The mobile packet core 262 can include at least one PGWs (214-1 ... 214-3.) Each PGW 214 can be associated with a distinct APN. The PGW 214 in the mobile packet core 262 can communicate with the MAG 228 using a 3GPP S2a interface 266. In some embodiments, the 3GPP S2a interface can use a Proxy Mobile IPv6 (PMIPv6) protocol to carry the data between the MAG 228 and the PGW 214. In other embodiments, the 3GPP S2a interface can use a General Packet Radio Service Tunneling Protocol (GTP) tunnel to carry the data between the MAG 228 and the PGW 214.

In some embodiments, a MAG 228 can establish a communication channel with the core network to provide communication to the UE 134. For example, the MAG 228 can establish a communication channel (i.e., a binding) with the UE's default home network (i.e., the default APN) in response to detecting the UE 134 on its access link. To establish this binding, the MAG 228 receives a policy profile of the UE 134 from the Authentication, Authorization, and Accounting (AAA) server 130. The policy profile can identify the UE's default home network (i.e., a default APN) as well as other home networks (i.e., other APNs) authorized to be accessed by the UE 134. The policy profile can also identify which applications are hosted by which home network, and further include IP flow selectors to be used for identifying APNs. The policy profile can also identify the domain name structure associated with each APN. Once the MAG 228 receives the policy profile of the UE 134, the MAG 228 can establish a binding with the default APN identified in the policy profile. In some embodiments, the MAG 228 can establish the binding with the PGW of the default APN. Upon establishing the binding, the MAG 228 can receive the IP address of the UE 134 from the default APN, and subsequently assign the received IP address to the wireless LAN interface of the UE 134.

In some embodiments, the MAG 228 can also establish bindings with other home networks (i.e., non-default APNs) associated with the UE 134. In one embodiment, the MAG 228 can establish a binding with an APN when the UE 134 sends IP packets to the particular APN. For example, as discussed previously, certain applications are associated with a particular APN. Therefore, when a MAG 228 receives a packet for a certain application, the MAG 228 needs to send the packet to the particular APN associated with the application. To do so, when the MAG 228 receives IP packets from a UE 134, the MAG 228 can determine the destination APN using the IP flow selector, and establish a binding with the determine APN. In another embodiment, the MAG 228 can establish bindings with all APNs associated with the UE 134 prior to detecting any application specific packet flows. The MAG 228 can identify all APNs associated with the UE 134 by analyzing the policy profile received from the AAA server 130. In other embodiments, the MAG 228 can identify IP flows associated with a particular APN by analyzing DNS exchanges. For example, the MAG 228 can match the requested domain requiring IP address resolution with a UE's policy profile. Subsequently, the MAG 228 can associate subsequently resolved IP addresses with the APN corresponding to the signaled domain.

In some embodiments, the MAG 228 can create a BUL entry in the BUL table 254. Upon establishing a binding with an APN, the MAG 228 can receive, from the local mobility anchor of the APN, an IP address that the particular APN has assigned to the UE 134. The MAG 228 may not assign the APN-specific IP address received from the particular APN, if the particular APN is not the default APN for the UE 134. This is because the UE's wireless LAN interface can only be assigned a single IP address. Instead, the MAG 228 can create a BUL entry that associates the particular APN and the received IP address, and store the BUL entry in the BUL table 254. The BUL entries in the BUL table 254 can keep track of all APN-specific IP addresses for the UE 134.

In some embodiments, the MAG 228 can mediate communication between a UE 134 and multiple APNs via network address translation. The UE 134 communicates with other devices using the IP address assigned by the default APN. However, the UE's default APN IP address is only known to the default APN and none of the other APNs. Therefore, when a non-default APN receives a packet from the UE 134, the non-default APN cannot identify which UE 134 sent the packet.

To address this issue, the MAG 228 can perform network address translation: the MAG 228 can replace the source IP address of the packets with the APN-specific IP address assigned by the appropriate destination APN. To perform the network address translation, the MAG 228 can monitor a packet received from the UE 134, determine the destination APN associated with the packet, and replace the source IP address of the packet using the UE's IP address associated with the destination APN. In some embodiments, the MAG 228 can determine the UE's APN-specific IP address using a locally stored state information. The locally stored state information can include a BUL table 254. In other words, in terms of the network address translation terminology, the trusted wireless LAN 252 can operate as a private network;

the mobile packet core 262 can operate as a public network; and the BUL table 254 can operate as a network address translation table.

Figure 4:
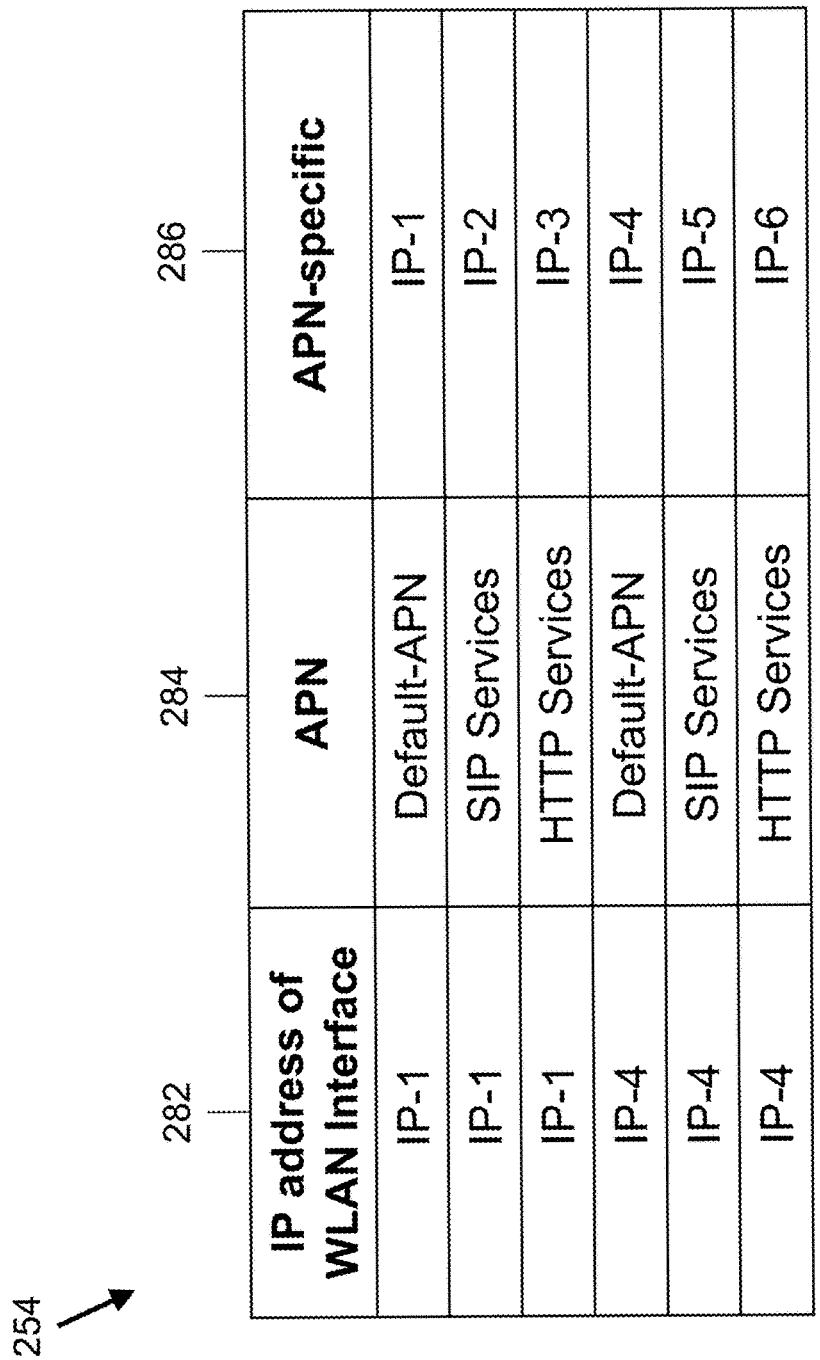
FIG. 4 illustrates a portion of a binding update list (BUL) table in accordance with certain embodiments of the disclosed subject matter.

FIG. 4 illustrates a portion of a BUL table in accordance with certain embodiments of the disclosed subject matter. Each row of the BUL table 254 indicates a BUL entry. Each BUL entry can include an IP address of a wireless LAN interface 282, an APN 284, and an APN-specific IP address 286. The BUL entry can be associated with a specific PDN connection/APN. Also, there can be multiple BUL entries at the MAG, for each APN/PDN connection. The IP address of a wireless LAN interface 282 indicates the IP address assigned to a UE 134 by the UE's default APN. Because the wireless LAN interface of a UE 134 can only be assigned a single IP address, different IP addresses of a wireless LAN interface 282 indicates different UEs.

FIG. 5 illustrates network address translation rules in accordance with certain embodiments of the disclosed subject matter. In some embodiments, the MAG 228 can maintain two sets of network address translation rules: one set for uplink data transmission (i.e., data transmission from the UE 134 to the mobile packet core 262) and another set for downlink data transmission (i.e., data transmission from the mobile packet core 262 to the UE 134.)

In the uplink scenario, a MAG 228 can operate according to the rule illustrated in the top row of FIG. 5. When a MAG 228 receives a packet from a UE 134 having an IP address "IP-1," the MAG 228 can determine the destination APN to which the packet is directed. The MAG 228 can determine the destination APN of the received packet using an IP flow selector. In some embodiments, the IP flow selector can determine the destination APN by determining the type of application sending the packet to the MAG 228. For example, when the received packet is associated with a Session Initiation Protocol (SIP) application, the IP flow selector can determine that the destination APN is "SIP services." In other embodiments, the IP flow selector can determine the destination APN by analyzing the destination IP address of the packet. In another embodiment, the IP flow selector can determine the destination APN by analyzing the domain name used to resolve the destination IP address of the packet.

Once the IP flow selector determines the destination APN, the MAG 228 can use the BUL entry to determine the APN-specific IP address associated with the destination APN. For example, according to the BUL table 254 in FIG. 4, for the UE 134 with an IP address "IP-1," the APN-specific IP address of the UE for "SIP services" is "IP-2." Therefore, the MAG 228 can replace "IP-1" in the received packet with "IP-2," and transmit the network address translated packet to the interface coupled to the destination APN.

In the downlink scenario, a MAG 228 can operate according to the rule illustrated in the bottom row of FIG. 5. When the MAG 228 receives a packet from the mobile packet core 262, the MAG 228 can determine from which APN the packet was received (i.e., the source APN.) In some embodiments, the MAG 228 can determine the source APN using an IP flow selector. In one embodiment, the IP flow selector can determine the source APN using the identifier of the communication interface over which the packet was received. The identifier of the communication interface can include a tunnel interface identifier. In another embodiment, the IP flow selector can determine the source APN using the IP address from which the packet was received.

Once the IP flow selector determines the source APN, the MAG 228 can use the BUL entry to determine the IP address of the UE 134. For example, according to the BUL table 254 in FIG. 4, if a packet is received from the "Internet Services" and the destination IP address of the packet is "IP-2," then the associated IP address of the wireless LAN interface is "IP-1." Therefore, the MAG 228 can replace "IP-2" in the received packet with "IP-6," and transmit the network address translated packet to the access link coupled to the UE 134.

Figure 6A:
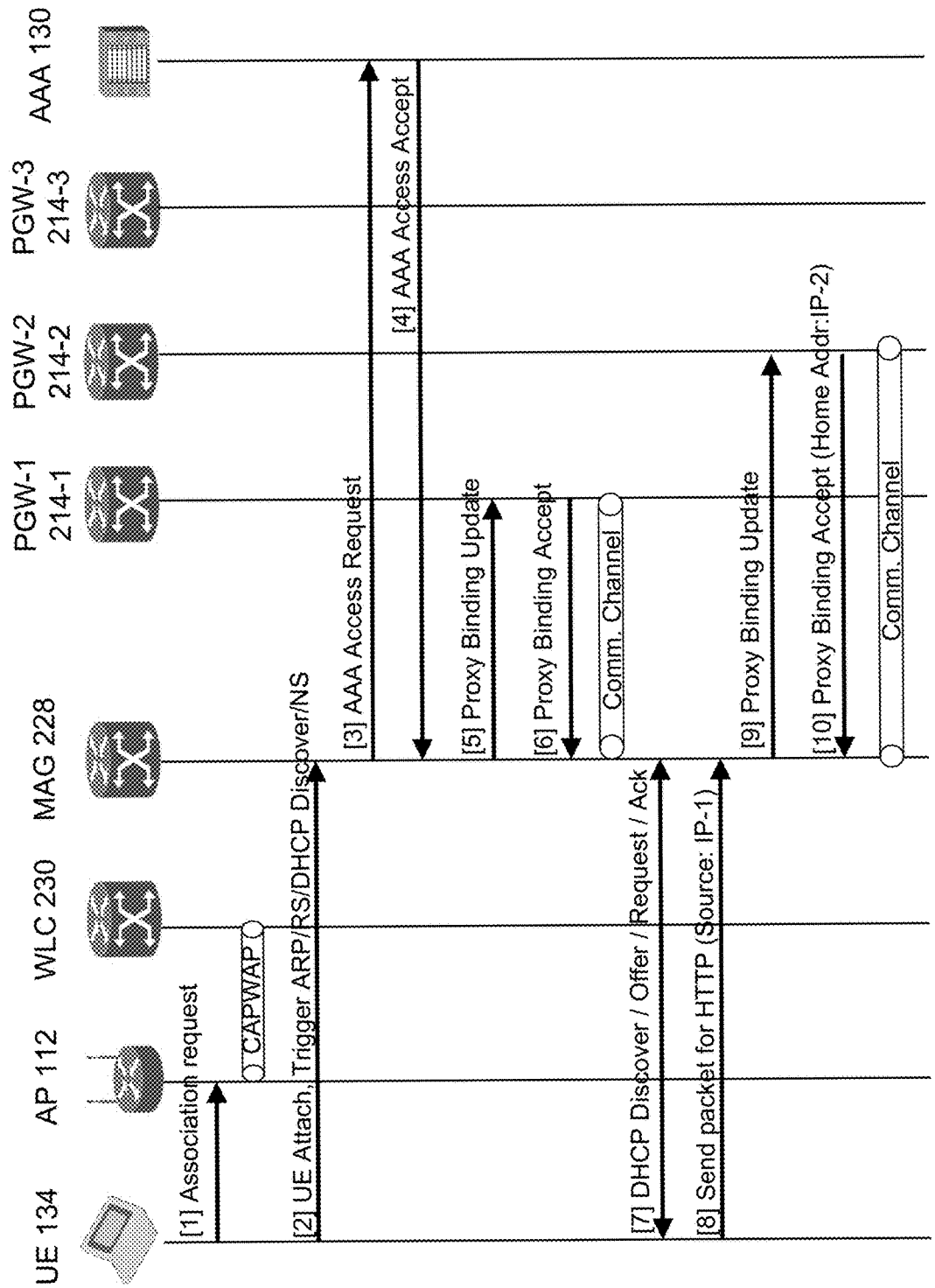
FIGS. 6A-6B show a message flow diagram illustrating communication between a user equipment (UE) in a trusted wireless local area network (LAN) and a mobile packet core in accordance with certain embodiments of the disclosed subject matter.
Figure 6B:
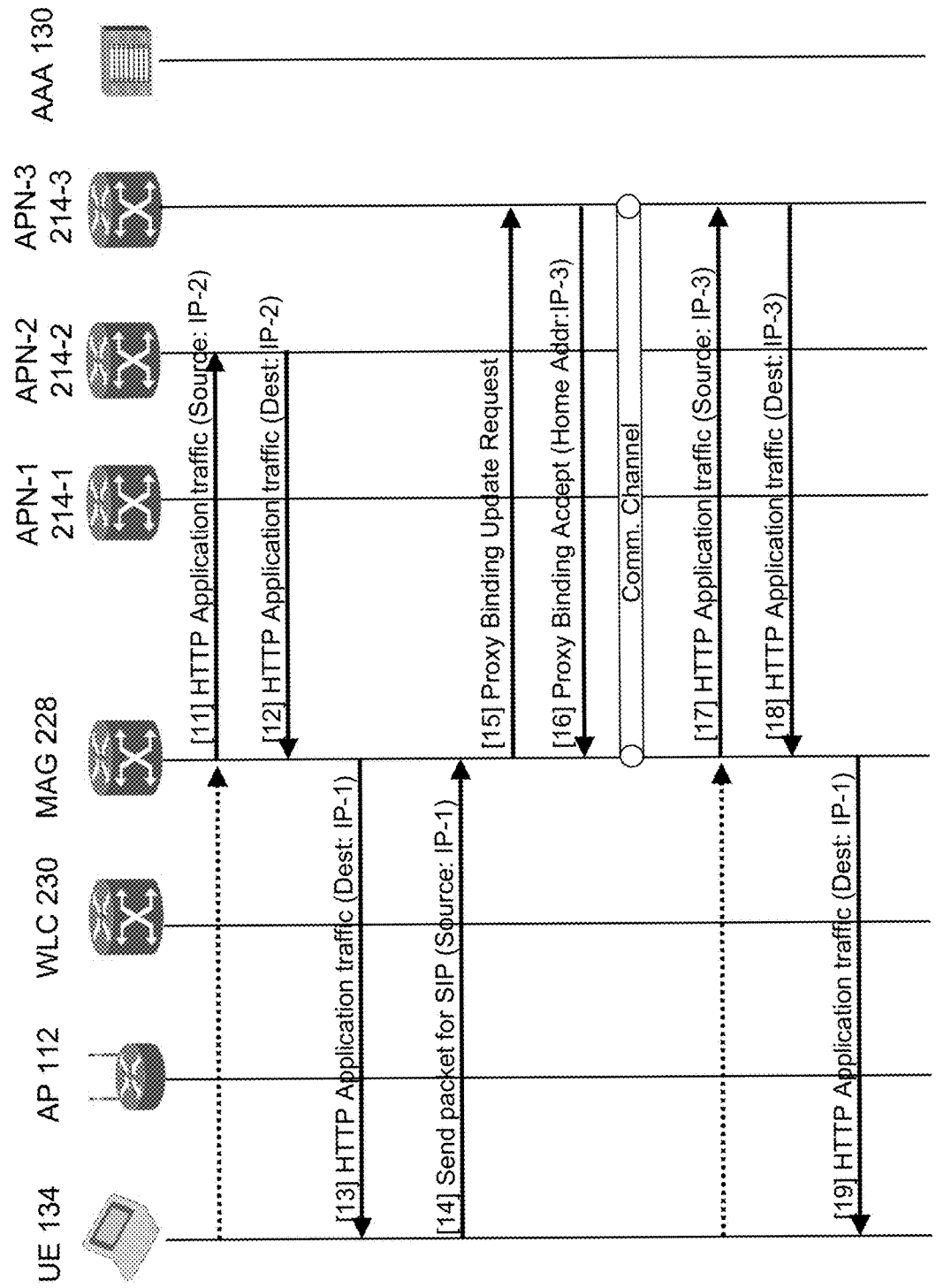

FIGS. 6A-6B show a message flow diagram illustrating communication between a UE in a trusted wireless LAN and a core network in accordance with certain embodiments of the disclosed subject matter. In step 1, the UE 134 can send an association request to the AP 112. The association request can include a mobile IP service set identification (SSID) associated with the UE 134. Upon receiving the association request, the AP 112 can establish a communication channel with the WLC 230. The communication channel can be established using the CAPWAP protocol.

In step 2, the UE 134 can send an attach request to the MAG 228 via the AP 112. The attach request can include the MAC address of the UE 134. The UE 134 can also trigger an Address Resolution Protocol (ARP). In addition, the UE 134 can send a Router Solicitation (RS) message, a DHCP-DISCOVER message, and a neighbor solicitation (NS) message to the MAG 228. In step 3, the MAG 228 can send an Authentication, Authorization, and Accounting (AAA) Access Request to the AAA server 130. The AAA access request can include the identification of the calling station ("Calling-Station-ID"), indicating the UE's MAC address that was included in the attach request.

In step 4, the MAG 228 can receive an AAA Access Accept from the AAA server 130. The AAA access accept can include a policy profile of the UE 134. The policy profile can identify the default home network (i.e., a default APN) as well as other home networks (i.e., other APNs) associated with the UE 134. The policy profile can also identify which applications are hosted by which home network and which domain names are associated with a particular APN, and further include IP flow selectors for the APNs identified in the policy profile.

When the MAG 228 receives the policy profile of the UE 134, the MAG 228 can determine the default APN for the UE 134 and establish a binding with the default APN. To this end, in step 5, the MAG 228 can transmit a proxy binding update (PBU) message. The PBU message can include a service selection field, which specifies the default APN. In the example shown in FIG. 6, the default APN is APN-1. Therefore, the PBU message gets routed to the local mobility anchor of the default APN, which can be a PGW-1 214-1 associated with APN-1. In step 6, the MAG 228 receives a proxy binding accept (PBA) message from the PGW-1 214-1, indicating that APN-1 identifies the UE 134 using the IP address "IP-1." Upon receiving the IP address from PGW-1 214-1, the MAG 228 can create a BUL entry in the BUL table 254, associating APN-1 with IP-1. The MAG 228 can also establish a communication channel with the PGW-1 214-1. In some embodiments, the communication channel can be established using a PMIPv6 tunnel. However, in other embodiments, the communication channel can be established using a GTP tunnel, or any other types of communication channels.

In step 7, the MAG 228 can assign the received IP address to the UE 134. To this end, the MAG 228 and the UE 134 can communicate DHCP handshake messages, including DHCPDISCOVER, DHCPOFFER, DHCPREQUEST, and DHCPACK. Upon completing the DHCP handshake, the UE 134 can configure its wireless LAN interface's IP address using the received IP address: "IP-1."

In step 8, the UE 134 can initiate an HTTP application and send an IP packet to the MAG 228. This IP packet can include a source IP address and a destination IP address. The source IP address of this packet is "IP-1", as configured by the UE 134 in step 7. The destination IP address can identify a corresponding node (CN) in the APN associated with the HTTP application, which is, in this example, APN-2.

When the MAG 228 receives the IP packet sent by the HTTP application, the MAG 228 can determine the destination APN of the packet using an IP flow selector. In this case, the IP flow selector would indicate that the destination APN is APN-2. Therefore, in steps 9-10, the MAG 228 can establish a binding for the UE 134 with APN-2. In step 9, the MAG 228 transmits a proxy binding update (PBU) message. The PBU message can include a service selection field, which specifies APN-2. Therefore, the PBU message gets routed to the local mobility anchor of APN-2, which can be a PGW-2 214-2. In step 10, the MAG 228 can receive a proxy binding accept (PBA) message from the PGW-2 214-2, indicating that APN-2 identifies the UE 134 using the IP address "IP-2." Subsequently, the MAG 228 can establish a communication channel with the PGW-2 214-2. In some embodiments, the communication channel can be established using a PMIPv6 tunnel. However, in other embodiments, the communication channel can be established using a GTP tunnel, or any other types of communication channels.

In some embodiments, upon receiving "IP-2" from PGW-2 214-2, the MAG 228 can create a BUL entry in the BUL table 254, associating UE's default IP address "IP-1" with the IP address received from APN-2, "IP-2." The BUL entry can also indicate, as illustrated in FIG. 4 in accordance with certain embodiments, that this association is for UE's traffic with APN-2.

In step 11, the MAG 228 can translate the source IP address of the packet received in step 8, from "IP-1" to "IP-2," and transmit the network address translated packet to the PGW-2 214-2. In some embodiments, the MAG 228 can receive additional packets from the UE 134, translate the source address of the additional packets from "IP-1" to "IP-2," and transmit the packets to the PGW-2 214-2. In step 12, the MAG 228 can receive packets from the PGW-2 214-2, directed to the UE 134. The destination IP address of these packets would indicate "IP-2" because the UE 134 is identified as "IP-2" in APN-2. When the MAG 228 receives packets from APN-2, the MAG 228 searches for BUL entries associated with "IP-2" and "APN-2," and identifies that "IP-2" is associated with the UE 134. Therefore, in step 13, the MAG 228 translates the destination address of the packets from "IP-2" to "IP-1" and transmits the packets to the UE 134.

While steps 8-13 enable the UE 134 to communicate with HTTP application's APN, similar steps can enable the UE 134 to communicate with Session Initiation Protocol (SIP)'s APN. These steps are illustrated in steps 14-19. In step 14, the UE 134 can initiate a SIP application and use the SIP application to send a packet to the MAG 228. This packet would indicate that the source IP address of the packet is "IP-1."

When the MAG 228 receives the IP packet, the MAG 228 can use the IP flow selector to determine the destination APN. In this case, the IP flow selector would indicate that the destination APN is APN-3. Therefore, in steps 15-16, the MAG 228 can establish a binding for the UE 134 with APN-3. In step 15, the MAG 228 transmits a proxy binding update (PBU) message. The PBU message can include a service selection field, which specifies APN-3. The PBU message gets routed to the local mobility anchor of APN-3, which can be a PGW-3 214-3. In step 16, the MAG 228 can receive a proxy binding accept (PBA) message from the PGW-3 214-3, indicating that APN-3 identifies the UE 134 using the IP address "IP-3." Subsequently, the MAG 228 can establish a communication channel with the PGW-3 214-3. In some embodiments, the communication channel can be established using a PMIPv6 tunnel. However, in other embodiments, the communication channel can be established using a GTP tunnel, or any other types of communication channels.

In some embodiments, upon receiving the IP address from APN-3, the MAG 228 can create a BUL entry in the BUL table 254, associating UE's default IP address "IP-1" with the received IP address, "IP-3." The BUL entry can also indicate, as illustrated in FIG. 4 in accordance with certain embodiments, that this association is for UE's traffic with APN-3.

In step 17, the MAG 228 can translate the source IP address of the packet received in step 14, from "IP-1" to "IP-3," and transmit the network address translated packet to the PGW-3 214-3. In some embodiments, the MAG 228 can receive additional packets from the UE 134, translate the source address of the additional packets from "IP-1" to "IP-3," and transmit the packets to the PGW-3 214-3. In step 18, the MAG 228 can receive packets from the PGW-3 214-3, directed to the UE 134. The destination IP address of these packets would indicate "IP-3" because the UE 134 is identified as "IP-3" in APN-3. When the MAG 228 receives packets from APN-3, the MAG 228 searches for BUL entries associated with "IP-3" and "APN-3," and identifies that "IP-3" is associated with the UE 134. Therefore, in step 19, the MAG 228 translates the destination address of the packets from "IP-3" to "IP-1" and transmits the packets to the UE 134.

In some embodiments, the UE 134 can resolve public DNS names using a Domain Name System (DNS) server in the default APN. The DNS server in the default APN can be a global public DNS server that can resolve public DNS names associated with other home networks (i.e., other APNs.)

In some embodiments, the UE 134 can resolve private DNS names using the MAG 228. Certain APNs may host private DNS names spaces that cannot be resolved using the global public DNS server in the default APN. To address this issue, in some embodiments, the MAG 228 can maintain a list of DNS servers that are associated with different APNs and provide this list to the UE 134. When the UE 134 wants to resolve a private DNS name associated with a particular APN, the UE 134 can use this list to identify which DNS server is responsible for the particular APN, and directly send the DNS query to the identified DNS server to resolve the private DNS name. In some embodiments, the MAG 228 can provide the list of DNS servers as a part of the DHCP configuration message.

In other embodiments, the UE 134 can resolve private DNS names using the MAG 228 as a proxy DNS server. The MAG 228 can be configured to maintain a list of DNS servers that are associated with different APNs, and identify to the UE 134 that it is a proxy DNS server. When the UE 134 wants to resolve a DNS name, the UE 134 can send a DNS query to the MAG 228. The MAG 228 can then select one of the known DNS servers and proxy the received DNS query to the selected DNS server. In one example, the MAG 228 can select the DNS server using preference information or the requested realm. If the proxied DNS query is not resolved by the selected DNS server, the MAG 228 can subsequently select an alternative DNS server and proxy the DNS query to the newly selected DNS server. This process is iterated until the MAG 228 resolves the DNS query.

Figure 7:
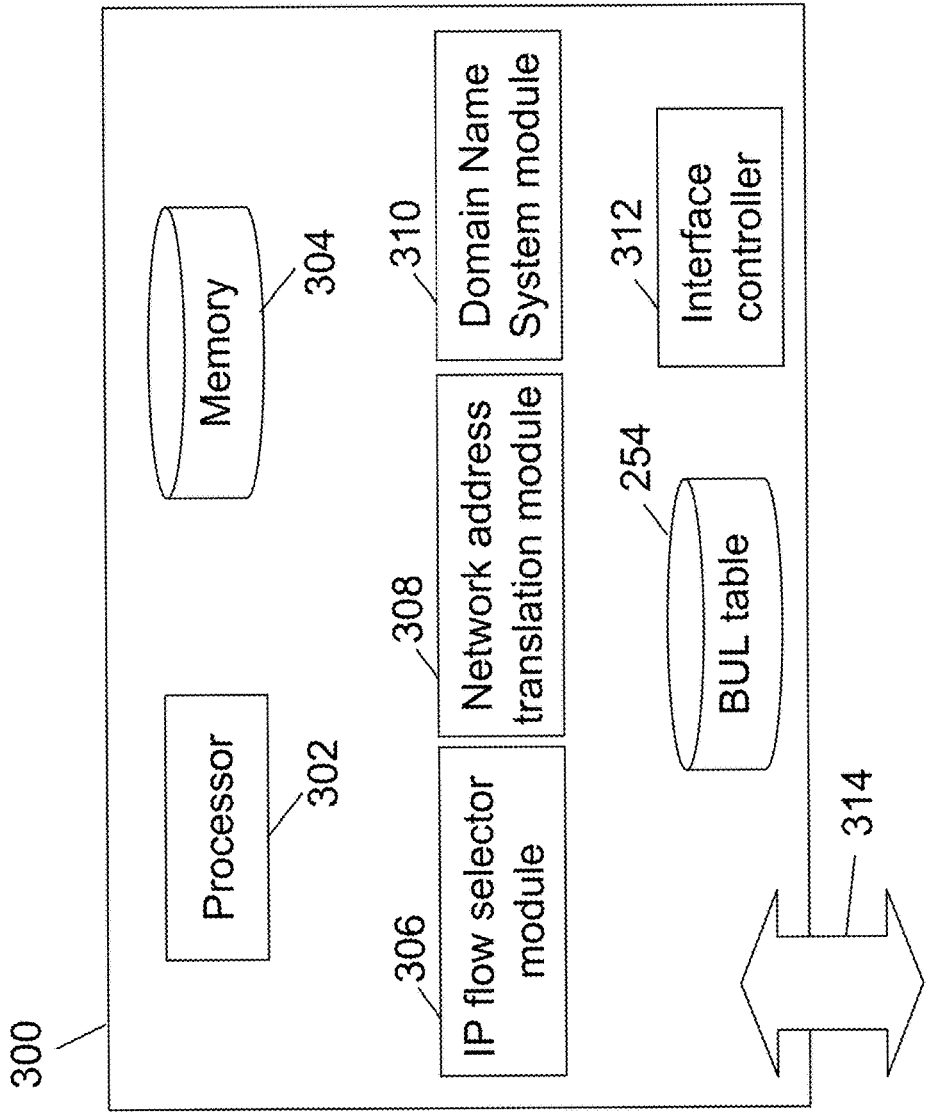
FIG. 7 shows a logical diagram of a mobility unit in accordance with certain embodiments of the disclosed subject matter.
Figure 8:
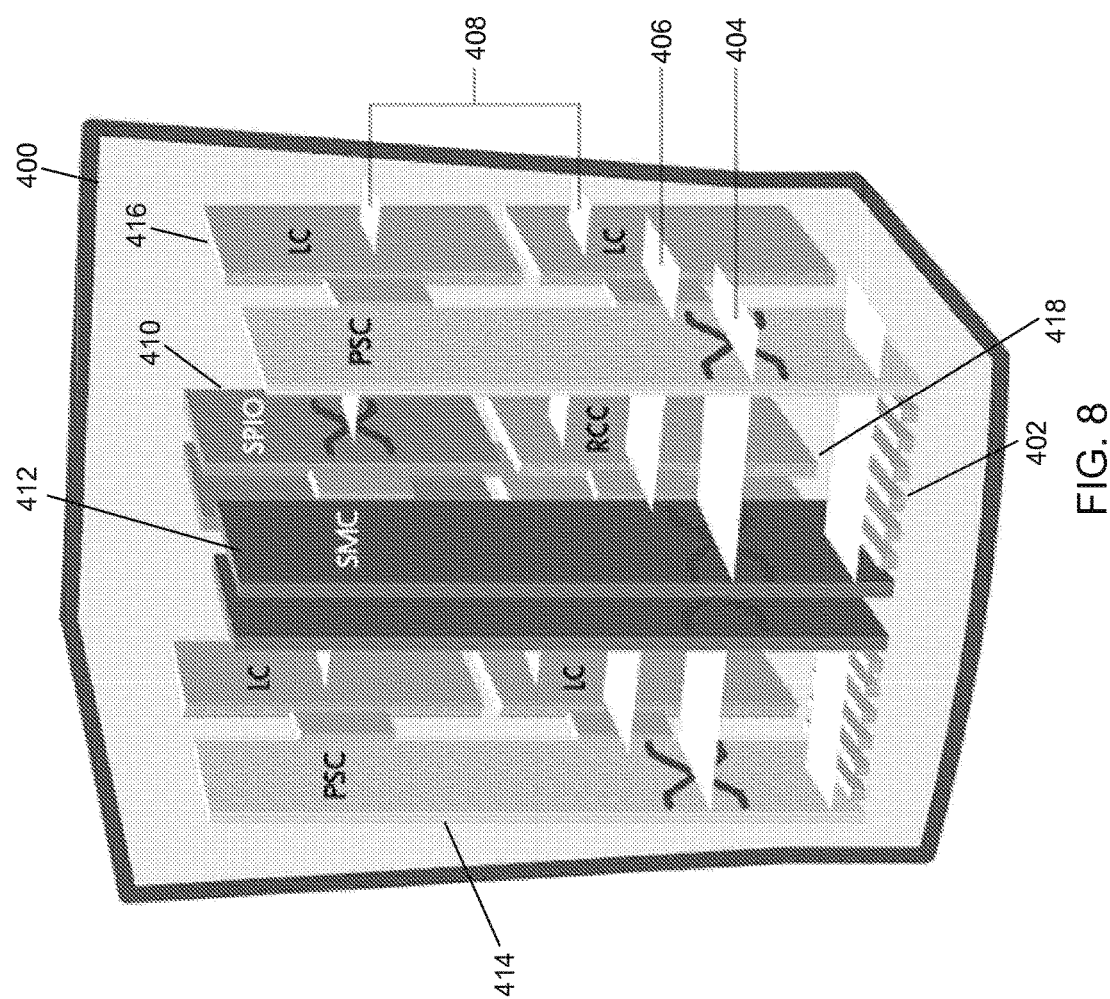
FIG. 8 illustrates a network device in accordance with certain embodiments of the disclosed subject matter.

FIG. 7 illustrates a logical view of a network device 300 in accordance with certain embodiments of the disclosed subject matter. The network device 300 can include a MAG 228. The network device 300 can include a processor 302, a memory 304, an IP flow selector module 306, a BUL table 254, a network address translation module 308, a domain name system (DNS) module 310, an interface controller module 312, and an interface 314.

The IP flow selector module 306 can be configured to identify an APN associated with a packet. In some embodiments, the IP flow selector module 306 can analyze the destination IP address or the source IP address of a packet to determine the APN associated with the packet. In certain embodiments, the IP flow selector module 306 can analyze the identifier of a communication channel over which the packet is received in order to determine the APN associated with the packet. In other embodiments, the IP flow selector module 306 can identify the application sending or receiving the packet to determine the APN associated with the packet.

The BUL table 254 can be configured to maintain BUL entries. Each BUL entry can indicate a binding between an IP address of a UE's wireless LAN interface (i.e., a default IP address) and an APN-specific IP address of the UE 134. In some embodiments, the default IP address can be associated with multiple BUL entries. In other words, the default IP address can be associated with multiple IP addresses, each indicating APN-specific IP addresses of the UE 134.

The network address translation (NAT) module 308 can be configured to translate a UE's default IP address to an APN-specific IP address, and vice versa. In some embodiments, the NAT module 308 can determine the mapping between UE's default IP address and an APN-specific IP address using the BUL table 254. For example, each BUL entry in the BUL table 254 can be considered a NAT binding, which binds UE's default IP address with an APN-specific IP address of the UE 134. In some embodiments, a NAT module 308 can create the BUL entries in the BUL table 254. For example, a NAT module 308 can create a BUL entry when a UE 134 initiates communication with another device in a core network In other embodiments, the NAT module 308 can create BUL entries associated with all APNs that can be reached by the UE 134, when the UE 134 initially attaches to the MAG 228.

The DNS module 310 can be configured to assist a UE 134 to resolve DNS names. The DNS module 310 can maintain a list of DNS servers associated with all APNs of interest. In some embodiment, the DNS module 310 can provide this list to the UE 134 so that the UE 134 can directly send a DNS query to an appropriate DNS server to resolve a DNS name. In other embodiments, the DNS module 310 can operate as a proxy DNS server. The DNS module 310 can receive a DNS query from a UE 134, select one of the DNS servers, and proxy the received DNS query to a DNS server. In some cases, the DNS module 310 can select the DNS server based on preference information or the requested realm.

The interface controller module 312 can be configured to establish communication with one or more PGWs in one or more APNs. In some embodiments, the interface controller module 312 can establish the communication using a 3GPP S2a interface. In one embodiment, the 3GPP S2a interface can use a Proxy Mobile IP v6 (PMIPv6) protocol to provide communication between the MAG 228 and the PGWs. In another embodiment, the 3GPP S2a interface can use a GPRS Tunneling Protocol (GTP) to provide communication between the MAG 228 and the PGWs.

The IP flow selector module 306, the BUL table 254, the NAT module 308, the DNS module 310, and the interface controller module 312 can be implemented in software using the memory 304 such as a non-transient computer readable medium, a non-transitory computer readable medium, a programmable read only memory (PROM), or flash memory. The software can run on a processor 302 that executes instructions or computer code. The IP flow selector module 306, the BUL table 254, the NAT module 308, the DNS module 310, and the interface controller module 312 may also be implemented in hardware using an application specific integrated circuit (ASIC), programmable logic array (PLA), or any other integrated circuit.

An interface 314 can provide an input and/or output mechanism to communicate with other network devices. The interface 314 can provide communication with network devices such as PGWs 214 and a WLC 230, as well as other core network nodes to send and receive control data. The interface 314 can be implemented in hardware to send and receive signals in a variety of mediums, such as optical, copper, and wireless, and in a number of different protocols some of which may be non-transient.

User Equipment and Network Device

The UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network.

The UE 134 also encompasses many other devices such as televisions (TVs), video projectors, set-top boxes or set-top units, digital video recorders (DVR), computers, netbooks, laptops, and any other audio/visual equipment that can communicate with a network. The UE 134 can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

The interworking between a cellular network and the trusted WLAN can be implemented, at least in part, in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 10 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 9:
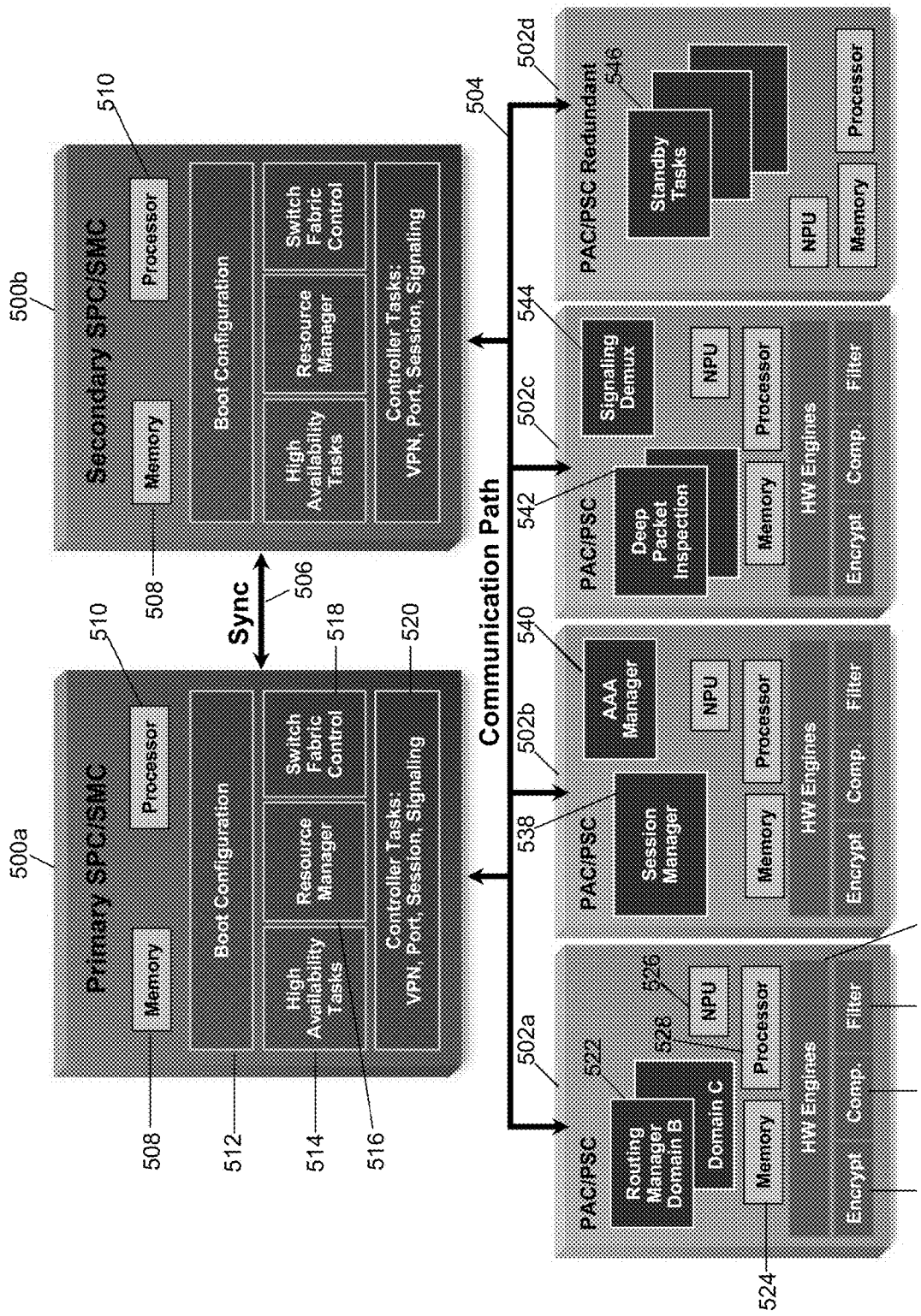
FIG. 9 illustrates a logical view of the software architecture of a network device in accordance with certain embodiments of the disclosed subject matter.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 9 illustrates a logical view of the software architecture of a network device in accordance with certain embodiments. As shown, the software and hardware can be distributed within the network device and across different circuit boards, processors, and memory. FIG. 9 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manages and controls the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for UE 134.

The PAC/PSC 502 is a high-speed processing card that is designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 is also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more UE 134. A session allows a UE 134 to communicate with the network for voice calls and data. The AAA manager 540 manages accounting, authentication, and authorization with an AAA server in the network. PAC/PSC 502 provides a DPI task 542 and a signaling demux 544. The DPI task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the MAG 228 can be a part of the WLC 230.

We claim:

1. A computer-implemented method of implementing mediation in a mobile access gateway, comprising, for each access point name (APN) of a plurality of APNs:
   receiving a respective packet at the mobile access gateway from a user equipment (UE), the UE operating in a trusted wireless local area network (LAN), the packet having a source Internet Protocol (IP) address;
   determining, at the mobile access gateway, the respective APN, of the plurality of APNs, associated with the respective packet based on a type of a respective user application sending the respective packet to the mobile access gateway, wherein the respective user application runs on the UE;
   creating, by operation of one or more computer processors, a binding update list (BUL) entry in a BUL table maintained by the mobile access gateway, including identifying a respective, distinct IP address of the UE used by the respective APN, wherein the respective IP address is different from the source IP address, wherein the BUL entry is created upon determining at least one of (i) that the UE is newly associated with the mobile access gateway and (ii) that the BUL table does not include any BUL entry associated with: the respective APN and the source IP address of the respective packet;
   enabling concurrent access to the plurality of APNs via the respective IP address identifying the UE, despite the UE having a wireless LAN interface restricted to only a single assigned IP address at a time via Dynamic Host Configuration Protocol (DHCP), by mediating communications between (i) the UE in the trusted wireless LAN and (ii) a respective home network having the respective APN, wherein mediating communications includes modifying, at the mobile access gateway, the respective source IP address of the respective packet to be the respective IP address of the UE used by the respective APN, the single assigned IP address comprising the source address; and
   transmitting the respective packet to the respective home network associated with the respective APN with the modified respective source IP address, including transmitting the respective packet to the respective APN via a 3GPP S2a interface;
   wherein the respective IP address of the UE used by each APN is distinct and is not assigned to the wireless LAN interface of the UE.

2. The computer-implemented method of claim 1, further comprising:
   receiving a new packet at the mobile access gateway from a new home network associated with a new APN, the new packet having a destination IP address;
   analyzing the BUL table in order to identify at the mobile access gateway an IP address of a wireless LAN interface of the UE, based on the new APN;
   modifying the destination IP address of the new packet to be the IP address of the wireless LAN interface of the UE; and
   transmitting the new packet to the UE with the modified destination address.

3. The computer-implemented method of claim 1, wherein the BUL entry is created upon determining that the BUL table does not include any BUL entry associated with: the respective APN and the source IP address of the respective packet.

4. The computer-implemented method of claim 1, wherein the BUL entry is created upon determining that the UE is newly associated with the mobile access gateway.

5. The computer-implemented method of claim 1, further comprising receiving a policy profile of the UE from an authentication, authorization, and accounting (AAA) server, the policy profile including rules for determining the respective APN associated with the respective packet.

6. The computer-implemented method of claim 1, wherein the packet is transmitted to a local mobility anchor associated with the home network.

7. The computer-implemented method of claim 1, wherein communications involving the UE in the trusted wireless LAN is extended beyond merely a single home network having an APN, to multiple home networks each having a respective APN, wherein the packet comprises a first packet, wherein the home network comprises a first home network, wherein the APN comprises a first APN, wherein the computer-implemented further comprises:
  receiving a second packet at the mobile access gateway from a second home network associated with a second APN, the second packet having a destination IP address; and
  analyzing the BUL table to identify at the mobile access gateway an IP address of a wireless LAN interface of the UE, based on the second APN.

8. The computer-implemented method of claim 7, further comprising:
  modifying the destination IP address of the second packet to be the identified IP address of the wireless LAN interface of the UE, in order to mediate communications between: the UE in the trusted wireless LAN, and the multiple home networks each having the respective APN; and
  transmitting the second packet to the UE with the modified destination address;
  wherein analyzing the BUL table in order to identify the IP address of the UE used by the first APN includes searching for a BUL entry associated with: the first APN and the source IP address of the first packet.

9. The computer-implemented method of claim 8, further comprising:
  receiving a policy profile of the UE from an authentication, authorization, and accounting (AAA) server, the policy profile including rules for determining the first APN associated with the first packet;
  wherein the first packet is transmitted, via the 3GPP S2a interface, to a local mobility anchor associated with the first home network.

10. The computer-implemented method of claim 9, wherein the BUL table maintained by the mobile access gateway maps multiple different APN-specific IP addresses to the source IP address of the respective packet, wherein each APN-specific IP address specifies a different IP address of the UE used by a particular APN, wherein the IP address of the UE used by the first APN is an IP address assigned to the UE by the first APN.

11. The computer-implemented method of claim 10, further comprising:
  receiving a third packet comprising a return packet from the first APN at the mobile access gateway for the UE, the return packet having a destination address that is the IP address of the UE used by the first APN;
  modifying the destination address of the third packet to be the source IP address of the first packet received from the UE; and
  transmitting the return packet with the modified destination address to the UE.

12. The computer-implemented method of claim 11, wherein the 3GPP S2a interface uses, in respective instances, a Proxy Mobile IP v6 (PMIPv6) protocol tunnel and a General Packet Radio Service Tunneling Protocol (GTP) tunnel.

13. The computer-implemented method of claim 1, wherein the 3GPP S2a interface uses at least one of a Proxy Mobile IP v6 (PMIPv6) protocol tunnel and a General Packet Radio Service Tunneling Protocol (GTP) tunnel.

14. A network device implementing mediation, the network device, comprising:
  one or more interfaces; and
  one or more computer processors, in communication with the one or more interfaces and configured to run a module stored in memory that is configured to perform an operation comprising, for each access point name (APN) of a plurality of APNs:
    receiving a respective packet from a user equipment (UE), the UE operating in a trusted wireless local area network (LAN), wherein the packet includes a source Internet Protocol (IP) address;
    determining the respective APN associated with the respective packet based on a type of a respective user application sending the respective packet to the network device, wherein the respective user application runs on the UE;
    creating a binding update list (BUL) entry in a BUL table stored in the network device, including identifying a respective, distinct IP address of the UE used by the respective APN, wherein the respective IP address is different from the source IP address, wherein the BUL entry is created upon determining at least one of (i) that the UE is newly associated with the network device and (ii) that the BUL table does not include any BUL entry associated with: the respective APN and the source IP address of the respective packet;
    enabling concurrent access to the plurality of APNs via the respective IP address identifying the UE, despite the UE having a wireless LAN interface restricted to only a single assigned IP address at a time via Dynamic Host Configuration Protocol (DHCP), by mediating communications between (i) the UE in the trusted wireless LAN and (ii) a respective home network having the respective APN, wherein mediating communications includes modifying the respective source IP address of the respective packet to be the respective IP address of the UE used by the respective APN, the single assigned IP address comprising the source address; and
    transmitting the respective packet to the respective home network associated with the respective APN with the modified respective source IP address, including transmitting the respective packet to the respective APN via a 3GPP S2a interface;
    wherein the respective IP address of the UE used by each APN is distinct and is not assigned to the wireless LAN interface of the UE.

15. The network device of claim 14, wherein the BUL entry is created upon determining that the BUL table does not include any BUL entry associated with: the respective APN and the source IP address of the respective packet.

16. The network device of claim 14, wherein the network device comprises a mobile access gateway, wherein the BUL entry is created upon determining that the UE is newly associated with the mobile access gateway.

17. The network device of claim 14, wherein the operation further comprises:

receiving a policy profile of the UE from an authentication, authorization, and accounting (AAA) server, the policy profile including rules for determining the respective APN associated with the respective packet.

18. The network device of claim 14, wherein the operation further comprises:
   receive a new packet from one of a plurality of home networks associated with a new APN, the new packet having a destination IP address;
   analyze the BUL table in order to identify an IP address of a wireless LAN interface of the UE, based on the new APN;
   modify the destination IP address of the new packet to be the IP address of the wireless LAN interface of the UE; and
   transmit the new packet to the UE with the modified destination address.

19. The network device of claim 14, wherein the 3GPP S2a interface uses at least one of a Proxy Mobile IP v6 (PMIPv6) protocol tunnel and a General Packet Radio Service Tunneling Protocol (GTP) tunnel.

20. Logic encoded on one or more non-transitory media and executable to perform an operation to implement mediation in a mobile access gateway, the operation comprising, for each of a plurality of APNs:
   receiving a respective packet at the mobile access gateway from a user equipment (UE), the UE operating in a trusted wireless local area network (LAN), the packet having a source Internet Protocol (IP) address;
   determining, at the mobile access gateway, the respective APN, of the plurality of APNs, associated with the respective packet based on a type of a respective user application sending the respective packet to the mobile access gateway, wherein the respective user application runs on the UE;
   creating, by operation of one or more computer processors when executing the logic, a binding update list (BUL) entry in a BUL table stored in the mobile access gateway, including identifying a respective, distinct IP address of the UE used by the respective APN, wherein the respective IP address is different from the source IP address, wherein the BUL entry is created upon determining at least one of (i) that the UE is newly associated with the mobile access gateway and (ii) that the BUL table does not include any BUL entry associated with: the respective APN and the source IP address of the respective packet;
   enabling concurrent access to the plurality of APNs via the respective IP address identifying the UE, despite the UE having a wireless LAN interface restricted to only a single assigned IP address at a time via Dynamic Host Configuration Protocol (DHCP), by mediating communications between (i) the UE in the trusted wireless LAN and (ii) a respective home network having the respective APN, wherein mediating communications includes modifying, at the mobile access gateway, the respective source IP address of the respective packet to be the respective IP address of the UE used by the respective APN, the single assigned IP address comprising the source address; and
   transmitting the respective packet to the respective home network associated with the respective APN with the modified respective source IP address, including transmitting the respective packet to the respective APN via a 3GPP S2a interface;
   wherein the respective IP address of the UE used by each APN is distinct and is not assigned to the wireless LAN interface of the UE.

21. The logic of claim 20, wherein the BUL entry is created upon determining that the BUL table does not include any BUL entry associated with the respective APN and the source IP address of the respective packet.

22. The logic of claim 20, wherein the operation further comprises:
   receiving a policy profile of the UE from an authentication, authorization, and accounting (AAA) server, the policy profile including rules for determining the respective APN associated with the respective packet.

23. The logic of claim 20, wherein the 3GPP S2a interface uses at least one of a Proxy Mobile IP v6 (PMIPv6) protocol tunnel and a General Packet Radio Service Tunneling Protocol (GTP) tunnel.

* * * * *